Aug. 14, 1956     W. D. FORD     2,758,937
PRODUCTION OF CELLULATED GLASS
Filed March 21, 1952
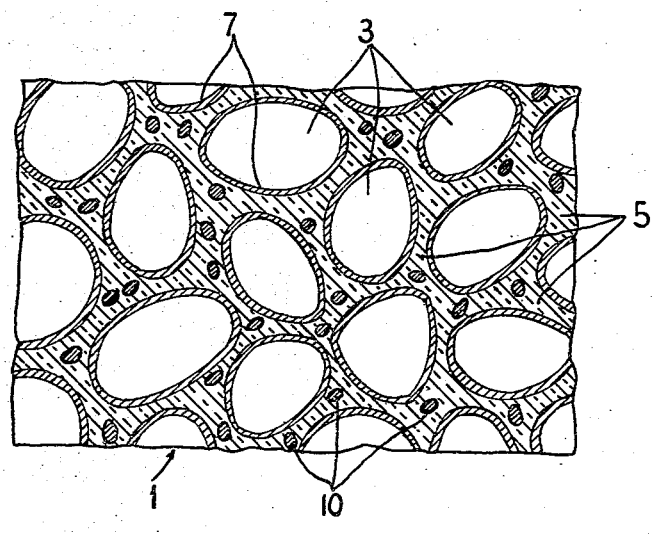
INVENTOR.
WALTER D. FORD
BY
*Oscar L. Spencer*
ATTORNEY

United States Patent Office 2,758,937
Patented Aug. 14, 1956

2,758,937

PRODUCTION OF CELLULATED GLASS

Walter D. Ford, Port Allegany, Pa., assignor to Pittsburgh Corning Corporation, Pittsburgh, Pa., a corporation Application March 21, 1952, Serial No. 277,917

15 Claims. (Cl. 106—40)

This invention relates to cellular glass bodies of improved cell structure and more uniform cell wall thickness which are suitable for use as insulating materials and it has particular relation to cellular glass bodies formed by bloating or cellulating partially fused glass.

It is known that highly cellulated glass suitable for use as an insulating material and other applications, may be prepared by heating a mixture of finely pulverized glass and an agent designed to give off gases at temperatures near the melting point or sintering point of the glass. A gassing agent which has been found to be quite useful is pulverulent carbon which may be used in the form of pulverized carbon, lamp black, carbon black, channel black, powdered coal, charcoal or graphite or any other form of finely divided carbon that is readily combustible. Other suitable gassing agents which have been used include calcium sulfate, calcium carbonate and carbon containing compounds such as urea.

One of the problems encountered in the manufacture of these cellulated glass bodies is the production of a cellulated glass body wherein the cell walls of the article are of uniform thickness and maximum strength. The properties of uniform thickness and maximum strength of cell walls are important in the manufacture of the cellulated article as well as in its use. During the manufacture of the cellulated glass article, it is desired to have the cell walls formed of uniform thickness and maximum strength by the expanding gases so as to prevent premature breakdown of the cell walls during the cellulation. Uniform thickness and maximum strength of cell walls are important in the use of the cellulated glass bodies to enable the bodies to carry higher loads under compression.

In accordance with the present invention, a cellular glass article is provided which has improved durability, low thermal conductivity, higher structural strength for a given density, a finer cell structure and more uniform cell wall thickness. This article is composed of a cellulated body of glass having a plurality of non-communicating cells filled with a gas such as $CO_2$ and having a metal such as molybdenum, tungsten or vanadium interspersed in and on the cell walls.

A sectional view of a slab of the cellulated material is shown in the drawing. The material is made up of cellulated glass 1 having a plurality of non-communicating cells 3 filled with a gas. The walls 5 of the cells are partially or fully coated with a fine film of metal 7 such as molybdenum, tungsten or vanadium. Also present in the cell walls 5 are small amounts of the metal 7 as shown at 10.

For purposes of illustration, the slab of cellulated material has been enlarged many times. The average size of a cell is usually about 1/32 of an inch in diameter, however, such size is designated merely by way of illustration and not by way of limitation. The cells can be quite small or much larger, for example, 1/4 inch in diameter or larger. Large cell size gives a product of lower density but also lower compressive strength.

The cellular glass which is the subject of this invention, is produced by commingling glass, a gassing agent and an oxide of a metal having a high melting and boiling point such as an oxide of molybdenum, tungsten or vandium all in pulverulent form, heating the mixture to a temperature at which it sinters and coheres and at which the gassing agent and the metal oxide such as molybdenum oxide react to produce gases which expand to form minute, non-communicating cells within the glass, cooling the cellulated glass and thereafter annealing it.

In the production of the cellulated glass, a glass of conventional formulation may be employed as the principal ingredient of the batch which is prepared for cellulation. For example, it may comprise ordinary lime-soda glass such as is employed in windows, and which consists essentially of silica, lime and soda in appropriate amounts, as is well known. This glass may also be modified by the inclusion of certain amounts of other ingredients, such as alumina, magnesia, borax, etc.

The glass is finely pulverized, for example, to a particle size that will pass a screen of 200 mesh or finer. This finely pulverized material may be ground with the gassing agent, e. g., finely divided carbon. The amount of finely divided carbonaceous material is susceptible of certain variation but, in any event, the amount required is never very large, usually being within the range of 0.1 to 5 per cent by weight of the batch. For example, in lamp black, the ratio will be approximately 0.5 to 1 per cent by weight, although slightly larger or smaller amounts may be employed. With carbon black, the ratio is even smaller, e. g., 0.15 to 0.2 per cent.

Various oxides of the metals mentioned above may be added to the pulverulent mixture of glass and gassing agent. Molybdenum anhydride has been found to be preferable, but molybdenum sesqui oxide, dioxide, and pentoxide, tungsten di- and trioxide and the various vanadium oxides have been found to be suitable. The amount of molybdenum oxide which is added to the mixture of pulverulent glass and gassing agent prior to cellulation is preferably within 0.05 to 1.0 per cent by weight of the three-component mixture, but larger amounts may be used. The components of the mixture above described are very carefully admixed, for example, by gradual or periodic addition of the carbon and molybdenum oxide to the glass cullet as it is being ground upon a ball mill.

As an alternative to the procedure described above a glass already containing the metal oxide may be pulverized and mixed with the gassing agent. The amount of metal oxide necessary when formulated with the glass will be slightly larger than when incorporated separately.

The mixture of glass, molybdenum oxide and gassing agent or agents is ground as fine as practicable upon the ball mill and is then ready for heating to form cellular glass. This heating operation is performed preferably in a reducing atmosphere and may be done by placing the mixture in appropriate amounts in suitable molds of sufficiently refractory material. Molds of stainless steel containing high percentages of nickel and chromium are especially suitable for the purpose. The molds are so constructed that they can be substantially closed, thus protecting the mixture to be sintered from oxidation during the heating operation. The molds should usually be approximately 1/7 filled, though of course, this will depend to some extent upon the degree of cellulation desired in the final product. In any event the amount should be adjusted so as to just fill the mold when full cellulation is attained.

The molds may be heated in any convenient furnace, but in commercial operation a tunnel furnace having suitable conveyor apparatus, such as a train of rollers designed to carry the molds slowly through the heating zone is to be desired. The heating operation is conducted slowly because of the low conductivity of the powdered materials. Usually it will be completed within a period of about 3 to 5 hours depending upon the thickness and size of the bodies to be formed. The temperature of heating should be sufficient to soften and sinter together the particles of glass and also to cause the gassing agent to react. This mass should never be completely melted. The temperature of heating will vary with individual glasses, but usually will be in or near the range of 1400 to 1800° F.

The bodies of cellular material as obtained by the foregoing process should be cooled slightly externally, stripped from the molds and annealed in order to relieve internal stresses in the glass. The products after annealing are trimmed to size and shape.

Such process produces bodies of a high degree of uniform cellularity. The addition of a metal oxide such as a molybdenum oxide to the pulverulent glass and gassing agent changes the surface tension of the cellulating glass in such manner that a minimum amount of cell breakdown occurs during cellulation, thus producing a finer cell structure with more uniform wall thickness. The specific gravity of the product will be approximately within a range of 0.14 to 0.18. Because of the large amount of entrapped gases, the resistance to transmission of heat is greater than that of less highly cellulated products.

The products are characterized by a high structural strength for a given density. Such high structural strength is due to the high degree of cellulation as well as uniformity of cellulation and uniformity of cell wall thickness which is rendered possible by the addition of the metal oxide to the pulverulent batch which is used in the manufacture of the glass. The high structural strength is also believed to be due to a coating of the metal on the walls of the individual cells or to particles of the metal in the actual structure of the walls. The metal results from the reaction of the gassing agent with the metal oxide during the heating and cellulating. The durability of the product is also improved by the presence of the metal as described above.

The invention has been described with respect to the cellulation of glass but it is intended to be operable with respect to the cellulation of other materials such as in the cellulation of slag, silica, glass batch materials, natural mineral silicates, etc.

Although the present invention has been described with reference to the specific details of certain embodiments thereof, it is not intended that such details shall be regarded as limitations upon the scope of the invention except insofar as included in the accompanying claims.

This application is a continuation-in-part of my copending application, Serial No. 734,241, filed March 12, 1947, now U. S. Patent No. 2,600,525, entitled "Cellular Glass of Increased Durability."

I claim:

1. An article of manufacture which comprises a cellulated body of glass having a plurality of non-communicating cells filled with a gas and having a coating on the cell walls of a metal selected from the group consisting of molybdenum, tungsten and vanadium.

2. An article of manufacture which comprises a cellulated body of glass having a plurality of non-communicating cells filled with a gas and having a coating of molybdenum of the cell walls.

3. An article of manufacture which comprises a cellulated body of glass having a plurality of non-communicating cells filled with carbon dioxide and having a coating of molybdenum on the cell walls.

4. An article of manufacture which comprises a cellulated body of glass containing molybdenum and having a plurality of non-communicating cells filled with a gas.

5. A method of producing cellular glass which comprises mixing a finely pulverized glass containing 0.05 to 1.0% of metal oxide selected from the group consisting of oxides of molybdenum, tungsten and vanadium with 0.1 to 5% carbon, heating the mixture in a mold to a temperature sufficient to soften and sinter together the particles of glass and to cause the carbon to react to form gases until a cellular glass of desired size is formed and cooling the cellular glass.

6. A method of producing cellular glass which comprises mixing a finely pulverized glass containing 0.05 to 1.0% of molybdenum oxide with 0.1 to 5% pulverulent carbon, heating the mixture in a mold to a temperature sufficient to soften and sinter together the particles of glass and to cause the carbon to react to form gases until a cellular glass of desired size is formed and cooling the cellular glass.

7. A method of producing cellular glass which comprises intimately mixing finely pulverized glass, 0.1 to 5% carbon and 0.05 to 1.0% of metal oxide selected from the group consisting of oxides of molybdenum, tungsten and vanadium, heating the mixture in a mold to a temperature sufficient to soften and sinter together the particles of glass and to cause the carbon and metal oxide to react to produce gases, discontinuing the heating when the gases developed within the glass increase the volume thereof to the desired extent whereby cells are formed which are noncommunicating, cooling and annealing the cellular glass product thus formed.

8. A method of producing cellular glass which comprises intimately mixing glass, 0.1 to 5% carbon and 0.05 to 1.0% molybdenum oxide, all in pulverulent form, heating the mixture in a mold to a temperature sufficient to soften and sinter together the particles of glass and to cause the carbon and molybdenum oxide to react to form gases, discontinuing the heating when the gases developed within the glass increase the volume thereof to the desired extent whereby noncommunicating cells are formed, cooling and annealing the cellular glass.

9. An article of manufacture which comprises a cellulated body of glass having a plurality of non-communicating cells filled with a gas and having a coating of tungsten on the cell walls.

10. An article of manufacture which comprises a cellulated body of glass having a plurality of non-communicating cells filled with a gas and having a coating of vanadium on the cell walls.

11. A batch suitable for forming cellular, vitreous products which consists essentially of a finely pulverized glass, 0.1 to 5% carbon and from 0.05 to 1.0% by weight of a metal oxide selected from the group consisting of oxides of molybdenum, tungsten and vanadium.

12. A batch suitable for forming cellular, vitreous products which consists essentially of finely pulverized glass containing 0.05 to 1.0% of metal oxide selected from the group consisting of oxides of molybdenum, tungsten and vanadium, and 0.1 to 5% carbon.

13. A batch suitable for forming cellular, vitreous products which consists essentially of a finely pulverized glass, 0.1 to 5% carbon and from 0.05 to 1.0% by weight of molybdenum oxide.

14. A batch suitable for forming cellular glass which consists essentially of an intimate, finely pulverized mixture of glass, 0.1 to 5% carbon designed to give off gases to bloat the mixture at the sintering point of the glass and from 0.5 to 1.0% by weight of tungsten oxide.

15. A batch suitable for forming cellular glass which consists essentially of an intimate, finely pulverized mixture of glass, 0.1 to 5% carbon designed to give off gases to bloat the mixture at the sintering point of the glass and from 0.05 to 1.0% by weight of vanadium oxide.

References Cited in the file of this patent

UNITED STATES PATENTS

| | | |
|---|---|---|
| 2,399,225 | Heany | Apr. 30, 1946 |
| 2,467,528 | Hauser | Apr. 19, 1949 |
| 2,600,525 | Ford | June 17, 1952 |